No. 655,864. Patented Aug. 14, 1900.
B. HEIMANN.
SELF LIGHTING CIGAR.
(Application filed Mar. 6, 1900.)
(No Model.)

composition

Witnesses,
J. F. Anne
E. A. Brandau

Inventor,
Benno Heimann
By Deway Strong & Co.
Atty

UNITED STATES PATENT OFFICE.

BENNO HEIMANN, OF SAN FRANCISCO, CALIFORNIA, ASSIGNOR OF ONE-HALF TO ISAAC DANNENBAUM, OF SAME PLACE.

SELF-LIGHTING CIGAR.

SPECIFICATION forming part of Letters Patent No. 655,864, dated August 14, 1900.

Application filed March 6, 1900. Serial No. 7,461. (No model.)

*To all whom it may concern:*

Be it known that I, BENNO HEIMANN, a citizen of Germany, residing in the city and county of San Francisco, State of California, have invented an Improvement in Self-Lighting Cigars; and I hereby declare the following to be a full, clear, and exact description of the same.

My invention relates to a cigar carrying upon itself a means for its ignition without the use of matches.

It consists of a specially-prepared compound mixed into a paste and incorporated with the ends of the rolled leaves of the cigar, so as to form an essential part of the structure.

Figure 1:
Figure 2:
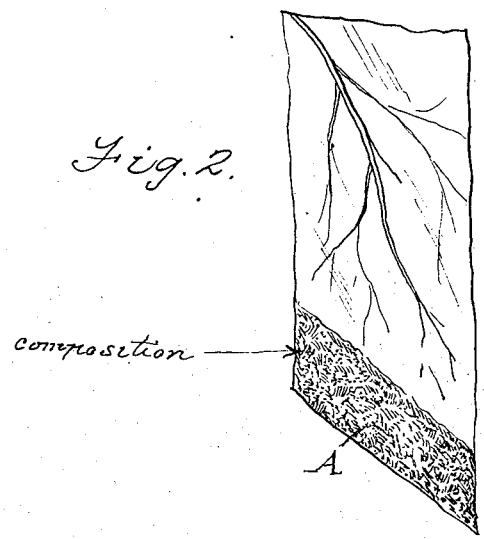

Figure 1 illustrates a cigar, partially broken away, embodying my invention. Fig. 2 illustrates a portion of a tobacco-leaf with the compound applied to it.

Various devices have been employed for lighting cigars—such as a match or pin inserted and protruding from the end of a cigar-tip with a composition and provided with a fulminate, or charcoal, or other material made adherent on the outer end by some adhesive material. The difficulty with these devices is that in the case of inserted foreign substances the lighting of the cigar injures its delicate flavor by reason of the wood or other foreign substance which is inserted.

In the application of pastes adherent to the end of the cigar the scratching or rubbing of the cigar is very apt to cause the material to become detached and fly off without performing the required service. In my invention I form a paste of materials, hereinafter described, of sufficient thinness and viscosity so that it may be made to extend a short distance into the interstices between the rolled ends of the leaves forming the cigar, and a sufficient portion of the material appears upon the ends of the leaves, so that when it is rubbed upon a proper surface this material will be ignited. By reason of its extending a short distance into the end of the cigar the ignition of the tobacco is rendered thorough and complete, and its adherence to the leaves is such that it cannot be removed except by cutting off the whole of the saturated end. The material is applied by saturating the ends of the leaves with it before the said leaves are rolled up, the object being to thoroughly saturate the ends of the leaves with the substance.

In carrying out my invention I employ a compound consisting of chlorate of potash, lampblack, pentasulphide of antimony, and charcoal, the whole mixed with a proportion of gelatine sufficient to form it into a comparatively-thin paste. This paste is applied to the cigar-leaves, as previously described, and when dry is in condition for use, showing the same color as the cigar and no great protuberance. For the igniting-surface I take bisulphide of mercury, charcoal, and pentasulphide of antimony, which is also mixed with gelatine and is applied to any suitable and convenient surface. It may be placed upon a cigar-case, or it may be spread upon a card or other surface convenient for the purpose, and when the cigar, prepared as previously described, is to be ignited it is only necessary to rub the end of the cigar upon this prepared surface and it will be thoroughly ignited.

Having thus described my invention, what I claim as new, and desire to secure by Letters Patent, is—

As an article of manufacture, a cigar the independent leaves of which, before being rolled into form, have their ends saturated with a composition including chlorate of potash, lampblack, pentasulphide of antimony, charcoal and gelatine.

In witness whereof I have hereunto set my hand.

BENNO HEIMANN.

Witnesses:
S. H. NOURSE,
JESSIE C. BRODIE.